United States Patent
Zhang

(10) Patent No.: US 9,436,403 B1
(45) Date of Patent: Sep. 6, 2016

(54) MEMORY CONTROLLER WITH ON-CHIP LINKED LIST MEMORY

(71) Applicant: MARVELL INTERNATIONAL LTD., Hamilton (BM)

(72) Inventor: David Zhang, San Jose, CA (US)

(73) Assignee: MARVELL INTERNATIONAL LTD. (BM)

( * ) Notice: Subject to any disclaimer, the term of this patent is extended or adjusted under 35 U.S.C. 154(b) by 205 days.

(21) Appl. No.: 13/856,011

(22) Filed: Apr. 3, 2013

Related U.S. Application Data

(60) Provisional application No. 61/619,652, filed on Apr. 3, 2012, provisional application No. 61/619,579, filed on Apr. 3, 2012.

(51) Int. Cl.
| | | |
|---|---|---|
| *G06F 12/00* | (2006.01) | |
| *G06F 3/06* | (2006.01) | |
| G06F 13/00 | (2006.01) | |
| G06F 13/28 | (2006.01) | |

(52) U.S. Cl.
CPC ........... *G06F 3/0631* (2013.01); *G06F 3/0604* (2013.01); *G06F 3/067* (2013.01)

(58) Field of Classification Search
CPC ..... G06F 3/0631; G06F 3/0604; G06F 3/067
USPC ............................................ 711/170; 710/56
See application file for complete search history.

(56) References Cited

U.S. PATENT DOCUMENTS

| | | | | |
|---|---|---|---|---|
| 5,689,506 | A * | 11/1997 | Chiussi et al. ................. | 370/388 |
| 2004/0049613 | A1* | 3/2004 | Kim et al. ....................... | 710/52 |
| 2004/0100942 | A1* | 5/2004 | Blank et al. .................. | 370/352 |
| 2004/0103086 | A1* | 5/2004 | Vinnakota ........... | G06F 9/30145 |
| 2009/0307557 | A1* | 12/2009 | Rao et al. ..................... | 714/749 |

\* cited by examiner

*Primary Examiner* — Mark Giardino, Jr.

(57) ABSTRACT

Systems, methods, and other embodiments associated with improving communication latencies by using a hardware linked list are described. According to one embodiment, an apparatus includes a pointer memory configured to store a free list that includes a plurality of pointers that each point to an address in a memory that is unallocated. The apparatus includes a memory controller configured to manage a linked list using pointers from the plurality of pointers stored in the free list. The apparatus includes a list memory configured to store the linked list.

15 Claims, 6 Drawing Sheets

400

| ECC 405 | HR 410 | B 415 | HoQ 420 | EoQ 425 | QCnt 430 |

Figure 4

MEMORY CONTROLLER WITH ON-CHIP LINKED LIST MEMORY

CROSS REFERENCE TO RELATED APPLICATIONS

This patent disclosure claims the benefit of U.S. provisional application Ser. No. 61/619,652 filed on Apr. 3, 2012 and U.S. provisional application Ser. No. 61/619,579 filed on Apr. 3, 2012, which are hereby wholly incorporated by reference.

BACKGROUND

The background description provided herein is for the purpose of generally presenting the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

As computing paradigms shift, difficulties with traditional solutions begin to arise. Consider that as computing shifts to cloud-based solutions, a user's experience is more sensitive to communication latency. Communication latency becomes more important because the user's experience is more closely tied to information transmitted between a local system and the cloud.

Communication latency can depend on many different factors including bandwidth, network congestion, processing bottlenecks, and so on. While solutions to some difficulties (e.g., bandwidth) may be simple (e.g., increase bandwidth), solutions to others (e.g., processing bottlenecks) are not. For example, when a local system is sending and receiving network communications, the local system buffers and processes each network packet using a processor of the local system. However, the processor is typically a general purpose CPU that is not optimized for processing network packets. Accordingly, bottlenecks may occur at the processor, which may cause increased latencies. For example, traditionally, in a software implemented linked list, a processor sequentially traced pointers along the linked list until, for example, reaching a pointer for a requested portion of data. However, tracing the linked this using a processor in this way results in a multiplicity of read operations to the linked list in memory that cause a bottleneck with memory access requests.

SUMMARY

In general, in one aspect this specification discloses an apparatus. The apparatus includes a pointer memory configured to store a free list that includes a plurality of pointers that each point to an address in a memory that is unallocated. The apparatus includes a memory controller configured to manage a linked list using pointers from the plurality of pointers stored in the free list. The apparatus includes a list memory configured to store the linked list.

In general, in another aspect, this specification discloses a method. The method includes receiving, in a memory controller, data to be stored in a memory. The method includes managing, in the memory controller, a linked list using pointers retrieved from a free list. The free list is implemented as part of the memory controller and contains a plurality of pointers that each point to locations in the memory that are unallocated. The method includes storing, in a list memory that is an on-chip memory of the memory controller, the linked list.

In general, in another aspect, this specification discloses a device. The device includes an ingress memory controller configured to assemble an ingress linked list of pointers for each network packet received from a network. The ingress linked list of pointers includes pointers that point to locations in a memory where successive portions of data are to be stored once allocated. The device includes an egress memory controller configured to assemble an egress linked list of pointers for each network packet egressing the device to the network. The egress linked list of pointers includes pointers that point to locations in the memory where successive portions of data are to be stored once allocated. The device includes a linked list memory connected to the egress memory controller and the ingress memory controller. The egress memory controller and the ingress memory controller are configured to store the ingress linked list and the egress linked list in the linked list memory. The linked list memory is an on-chip memory of the device. The device includes a pointer memory connected to the ingress controller and the egress controller. The egress memory controller and the ingress memory controller are configured to store a free list of pointers in the pointer memory. The free list of pointers includes pointers to addresses in the memory that are unallocated. The ingress memory controller and egress memory controller are configured to use pointers from the free list when assembling the ingress linked list and the egress linked list.

BRIEF DESCRIPTION OF THE DRAWINGS

The accompanying drawings, which are incorporated in and constitute a part of the specification, illustrate various systems, methods, and other embodiments of the disclosure. Illustrated element boundaries (e.g., boxes, groups of boxes, or other shapes) in the figures represent one example of the boundaries. In some examples, one element may be designed as multiple elements or multiple elements may be designed as one element. In some examples, an element shown as an internal component of another element may be implemented as an external component and vice versa.

FIG. 4 illustrates one example format of a descriptor of a hardware linked list.

DETAILED DESCRIPTION

Described herein are examples of systems, methods, and other embodiments associated with improving communication latencies by using a hardware linked list. Consider that network communications stored in a device are referenced in a memory of the device using a linked list. A linked list is a series of pointers. The linked list is "linked" in that each pointer references a following pointer in the list (e.g., a singly linked list) as well as an address in the memory where a portion of a network communication or multiple communications are stored. Adjacent pointers in the linked list address adjacent portions of the network communication. Because a network communication (e.g., a packet) is generally separated into several portions and then stored among several memory locations, the device uses a linked list to track where the portions of the packet are stored and to ensure the portions are kept in order even though the portions can be stored in memory locations that are not sequential. Additionally, the linked list may also reference multiple network communications and thus may also keep an order of the multiple communications.

However, accessing a portion of data in the network communication requires traversing (also referred to as tracing or chasing) the linked list sequentially from beginning to wherever a pointer for the desired portion is located in the linked list (e.g., beginning, middle, or end). For example, if the portion of data is referenced by a first pointer in the linked list then only a single memory access to the linked list may be necessary. However, if the portion of data is, for example, referenced by a fourth pointer in the linked list, then many memory accesses may be necessary to access the portion of data each time it is requested. In general, the more you traverse along the link list, the more memory accesses are made.

Consequently, a software implemented linked list negatively influences communication latencies since serially traversing the linked list using a central processing unit (CPU) requires many memory requests that add time to processing communications. Additionally, the CPU may interrupt the accesses of the linked list in favor of other tasks which prolongs latencies even more. Accordingly, using the software implemented linked list results in processing bottlenecks. Thus, in one embodiment of the present disclosure, a memory controller implements the linked list in hardware that is independent of a CPU. By using a hardware implemented linked list, latencies are improved by, for example, avoiding memory requests between the CPU and a memory.

Figure 1:
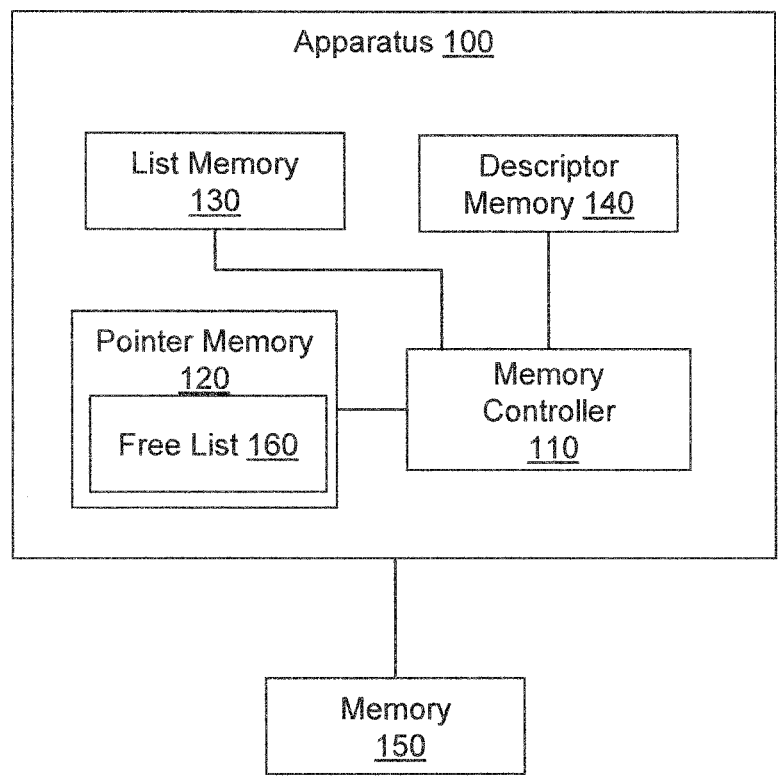
FIG. 1 illustrates one embodiment of an apparatus associated with improving communication latencies by using a hardware linked list.

With reference to FIG. 1, one embodiment of an apparatus 100 associated with improving communication latencies by using a hardware linked list is illustrated. The apparatus 100 may be implemented in a network communication device or, more generally, in any device that processes/stores network communications or other data. The apparatus 100 includes a memory controller 110, a pointer memory 120, a list memory 130, and a descriptor memory 140. The apparatus 100 is, for example, connected to a memory 150 that is a random access memory (RAM), flash memory, or other memory for storing data (e.g., network packets). In one embodiment, the apparatus 100 and the memory 150 are integrated into a network communication device (e.g., a network interface card).

For example, consider that the apparatus 100 is integrated with a network card (e.g., an Ethernet card) of a computing system (not illustrated). Further consider that the computing system operates a thin client that participates as part of a cloud computing system (not illustrated). The cloud computing system, for example, processes data, stores data, and more generally provides services to the thin client via a network connection with the computing system that includes the apparatus 100. Accordingly, as the thin client participates in different events with the cloud computing system, network communications are exchanged between the cloud computing system and the computing system.

Thus, the memory controller 110 in the apparatus 100 is configured to manage (e.g., assemble or use) a linked list for each communication (e.g., ingress or egress) that is processed by the computing system instead of performing these functions by a CPU of the computing system. In this way, latencies between the cloud and the computing system are improved. For example, the pointer memory 120 stores a free list 160 of pointers. The free list 160 includes pointers that are unstructured individual pointers that are not configured in a linked list structure. Each pointer in the free list 160 of pointers references an address in the memory 150 that is unallocated (i.e., unused). That is, addresses/locations in the memory 150 that are referenced by the pointers in the free list 160 are not presently being used to store data (e.g., active data) and, thus, are free to be allocated to store communications.

The memory controller 110 is configured to assemble a linked list using pointers from the free list 160. For example, the memory controller 110 receives a packet that is either an ingress packet from the network or an egress packet that is destined for the network. While the memory controller 110 is discussed as handling both ingress and egress packets, in one embodiment, the apparatus 100 may include separate memory controllers for ingress and egress processing paths. In either case, the memory controller 110 assembles the linked list for a network packet by, for example, iteratively assigning pointers from the free list 160 to successive portions of the network packet.

Additionally, the memory controller 110 is configured to link the pointers by constructing the linked list with each pointer referencing a next pointer in the linked list in addition to an address in the memory 150. In one embodiment, the apparatus 100 also includes a linked list assembly queue that is used by the memory controller 110 to store portions of the linked list during assembly. The assembly queue (not illustrated) is, for example, a working memory of the apparatus 100 that is an on-chip memory. That is, the apparatus 100 uses the assembly queue to construct, manipulate, and/or manage the linked list. In one embodiment, the apparatus 100 uses the assembly queue when assembling a linked list for one or more packets. After the linked list is assembled, the memory controller 110 merges the linked list into the list memory 130. In one embodiment, the memory controller 110 loads a linked list from the list memory 130 into the assembly queue to perform one or more actions (e.g., modify, manage, traverse, etc.) on the linked list.

Figure 2:
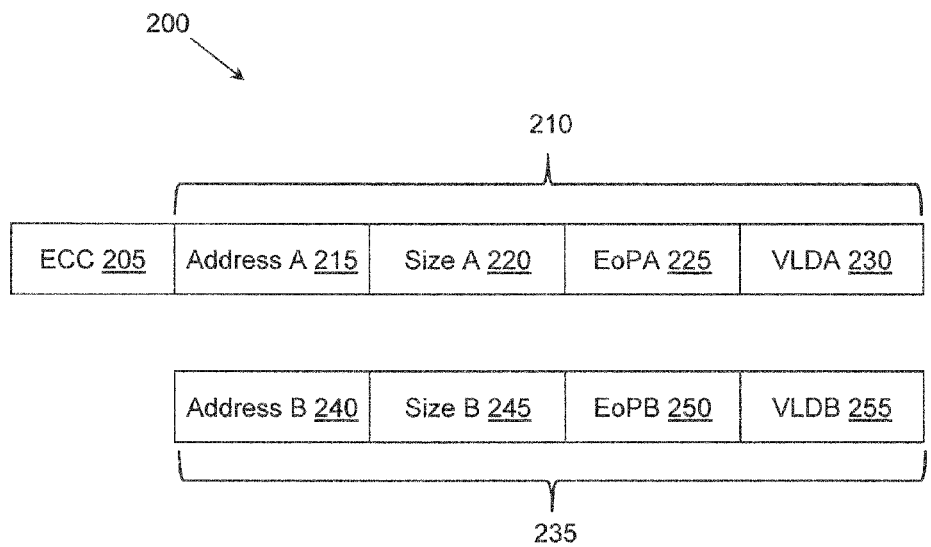
FIG. 2 illustrates an example format for entries in a hardware linked list.

Consider an example linked list entry 200 as illustrated in FIG. 2. The linked list entry 200 includes an error correction code (ECC) 205, which is a checksum or other validation field for the entry 200. The list entry 200 also includes a first pointer 210. The first pointer includes an address A field 215, a size A field 220, an EoPA field 225, and an VLDA field 230. The address A field 215 includes an address of a location in memory (i.e., the memory 150) referenced by the pointer 210. The size A field 220 indicates a size (e.g., 32 bytes) of data stored in the location in memory referenced by the address A field 215. The EoPA field 225 indicates whether data referenced by the pointer 210 is data that is at an end of a packet of data. The VLDA field 230 indicates whether the pointer 210 is valid. The entry 200 also includes a second pointer 235 that includes an address B field 240, a size B field 245, an EoPB field 250, and a VLDB field 255. In general, the fields 240-255 include similar information as fields 215-230 except with reference to the second pointer 235 instead of the first pointer 210. While the entry 200 is illustrated with certain specific fields, of course, in other embodiments the entry 200 may include a different number and different types of fields.

Figure 3:
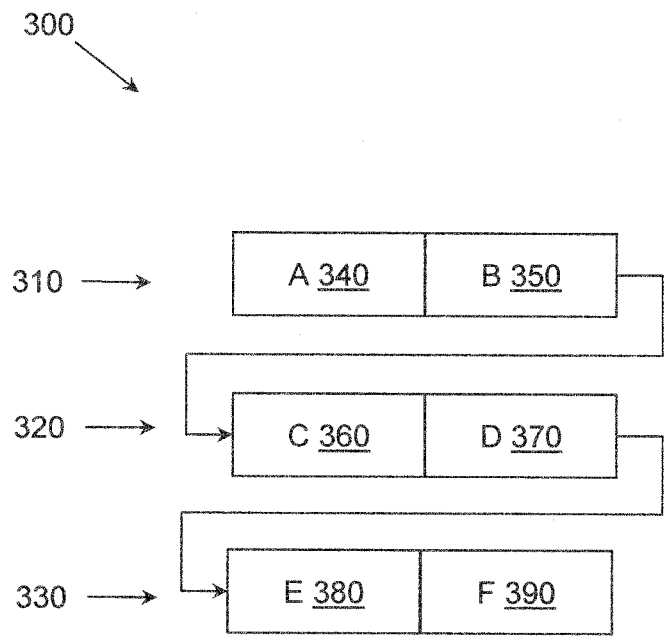
FIG. 3 illustrates one embodiment of a hardware linked list.

Now consider FIG. 3, which illustrates one example of a linked list 300 that has been assembled by the memory controller 110 of FIG. 1. The linked list 300 includes three entries 310-330 (e.g., three iterations of entry 200 of FIG. 2). The entry 310 includes two pointers, pointer A 340 and pointer B 350. In FIG. 3, the linked list 300 is configured such that the pointer A 340 links to the pointer B 350 by being placed in the entry 310 prior to the pointer B 350. That is, the pointer A 340 references the pointer B 350 by virtue of the order of placement in the entry 310. Accordingly, data referenced by the pointer A 340 is data that occurs before data referenced by the pointer B 350 in, for example, a packet of data. The pointer B 350 links to the entry 320 and a first pointer C 360 in the entry 320. The pointer B 350 links to the pointer C 360 using a reference pointer or other structure that provides a location of the pointer C 360. The pointer C 360 links to a pointer D 370 of the entry 320. The linked list 300 continues with the pointer D 370 linking to the entry 330 and pointer E 380. The pointer E 380 links to a pointer F 390 of the entry 330. This structure repeats for successive portions of a network packet until reaching an end of the network packet. In this way, the linked list 300 maintains an order of portions of data of the network packet.

The linked list 300 illustrates a linked list with six pointers. Of course, the memory controller 110 assembles a linked list based on attributes of a network packet. That is, a linked list includes only as many pointers as necessary to store the network packet. For example, each pointer references a location in the memory 150 that is a certain size (e.g., 32 bytes). Thus, if a packet is 256 bytes, then the memory controller assembles a linked list that includes eight pointers (i.e., 8×32=256). Furthermore, in other circumstances the linked list may be smaller, larger, have an odd number of pointers, and so on. In general, the linked list 300 includes a series of pointers within pointer entries that each include two or more pointers.

Continuing with FIG. 1, once the memory controller 110 assembles the linked list on-chip by allocating pointers from the free list 160 and successively linking the pointers together for adjacent portions of the network packet, the memory controller 110 stores the linked list. In one embodiment, the memory controller 110 stores the linked list on-chip (i.e., within the apparatus 100) in the list memory 130. The list memory 130 is a RAM, cache, or other on-chip memory for storing linked lists. The list memory 130 is configured to store, for example, a plurality of linked lists that are each for a different network packet. In this way, the apparatus 100 can quickly access and traverse the linked lists stored in the on-chip list memory 130 independently of a processor (e.g., CPU) of an associated computing system within which the apparatus 100 is integrated. In general, not only does implementing the linked list within the apparatus 100 avoid latencies caused by the CPU, but because the linked lists are stored in the list memory 130, which is a lower latency memory, accessing the linked lists is quicker because of reduced access times to the list memory 130 by the memory controller 110.

Additionally, in one embodiment, the list memory 130 stores a main list that includes a plurality of linked lists for individual packets. The apparatus 100, for example, loads portions of the main list into the assembly queue and traverses or, more generally, manages the individual linked lists in the assembly queue. In this way, the apparatus 100 traverses only the individual list in the assembly queue and not the entire main list in the list memory 130.

Furthermore, in one embodiment, the memory controller 110 stores a descriptor of each linked list in a descriptor memory 140. In one embodiment, the descriptor memory 140 is an on-chip memory of the apparatus 100 that is a RAM, cache, queue or other on-chip memory for storing and quickly accessing information. The memory controller 110 uses the descriptor to reference a linked list without retrieving the linked list from the list memory 130. The descriptor memory 140 stores, for example, a descriptor for each linked list in the list memory 130. Each descriptor includes a head pointer that references a first entry of a linked list and a tail pointer that references a final entry of the linked list. In this way, accessing each individual linked list in the list memory 130 is improved.

For example, one embodiment of a descriptor 400 is illustrated in FIG. 4. The descriptor 400 includes an ECC field 405, an HR field 410, a B field 415, an HoQ field 420, an EoQ field 425, and a QCnt field 430. The ECC field 405 includes an error correction code for verifying that the descriptor 400 is not corrupted. The HR field 410 indicates whether the descriptor 400 is a link to an associated linked list or that the descriptor 400 is part of the linked list. The B field 415 indicates a slot selection for when the descriptor is part of the linked list (e.g., whether the descriptor is a first or second pointer in an entry). The HoQ field 420 is a head pointer for the linked list (e.g., points to a first entry in the linked list). The EoQ field 425 is a tail pointer for the linked list (e.g., points to a final entry in the linked list). The QCnt field 430 indicates a number of pointers in the linked list.

Continuing with FIG. 1, in one embodiment, the memory controller 110 accesses a linked list in the on-chip list memory 130 to service a memory access request. For example, as part of processing a network packet in the computing system, the memory controller 110 receives memory access requests for portions of network packets. Accordingly, the memory controller 110, in response to the memory request, traces pointers (i.e., traverses pointers in a linked list) in a linked list until locating the requested portion of the network packet. The memory request is, for example, a request to read, modify, or write the portion of data. In this way, the memory controller 110 uses the linked list stored in the on-chip list memory 130 independently and separate from a processor (e.g., cpu) associated with the apparatus 100. Thus, the memory controller 110 transparently accesses data using linked lists without encountering latencies introduced when the processor is involved with tracing pointers in linked lists. Consequently, the apparatus 100 improves communications latencies and, for example, optimizes a network interface card for cloud computing.

Figure 5:
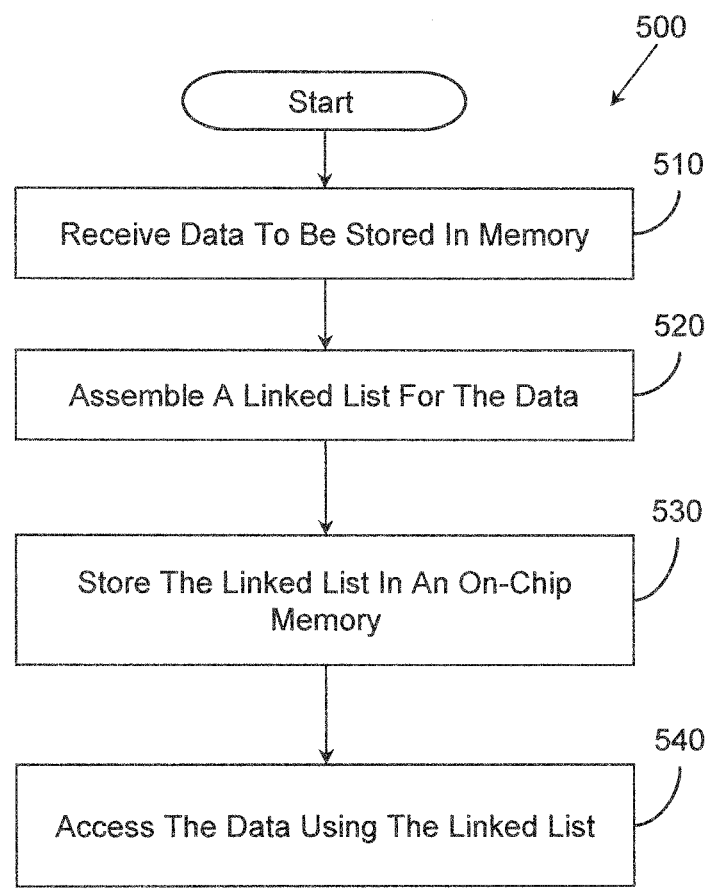
FIG. 5 illustrates one embodiment of a method associated with improving communication latencies by using a hardware linked list.

Further details of improving communication latencies by using a hardware implemented linked list will be discussed in relation to FIG. 5. FIG. 5 illustrates a method 500 associated with a hardware implemented linked list. FIG. 5 will be discussed from the perspective of the memory controller 110 of FIG. 1.

At 510 of method 500, the memory controller 110 receives data to be stored in a memory associated with the memory controller 110. The data is, for example, a network packet from communicating in a cloud computing system or some other data. The memory controller 110 receives the data from, for example, a processing block within the apparatus 100 or from, for example, Ethernet ports in the apparatus 100. In one embodiment, the data is associated with a remote direct memory access (RDMA), an Internet wide area RDMA protocol (iWARP) access, a zero-copy access, a virtual machine memory access, a cloud computing memory access, a network function virtualization (NFV) access, and so on. In general, the data is latency sensitive.

At 520, the memory controller 110 assembles (i.e., manages) a linked list for the data independent of interaction from a processor (e.g., CPU). The linked list is a series of pointers that point to locations in the memory where successive portions of the data are to be stored. Accordingly, assembling the linked list allocates memory space for storing the data. In general, the memory space is not contiguous but rather spread across different locations as a function of pointers (i.e., addresses in memory referenced by the pointers) used to assemble the linked list.

In one embodiment, the pointers used to assemble the linked list for the data are retrieved from a free list of pointers. The free list of pointers includes pointers that point to addresses in memory that are unallocated. For example, pointers are allocated for new data as it is received. In general, the new data is then processed/stored and eventually deleted after, for example, being transferred to a different location. Accordingly, in one embodiment, the memory controller 110 recycles the pointers by placing pointers for deleted or expired data back on the free list for re-use. The pointers in the free list are unstructured (i.e., not associated with a linked list or other structure) and generally are not sequentially ordered. Consequently, when assembling the linked list, the pointers are retrieved (by the memory controller 110) from the free list and used regardless of whether they address sequential memory locations or not. Thus, retrieving pointers in this way results in portions of data for a packet being stored in disparate memory locations.

Additionally, in one embodiment, the pointers in the free list may be sorted according to which memory bank in the memory the pointers reference. That is, the memory controller 110 sorts and groups the pointers in the free list according to which bank in the memory each of the pointers reference. Thus, successive pointers retrieved from the free list may address different memory banks in the memory in order to optimize use of memory channels when reading and writing to the memory. However, in general, pointers retrieved from the free list are not otherwise sorted or arranged. Accordingly, the data is stored in the memory as a function of which pointers are retrieved from the free list.

Furthermore, at 520, the memory controller 110 links each pointer to a next pointer retrieved from the free list for successive portions of the data. In this way, the linked list maintains an order of the portions of the data even though the portions are not stored in sequential locations within the memory. In one embodiment, the memory controller 110 links pointers within the linked list by assembling the linked list with at least two pointers in each entry and then linking successive entries. That is, an entry in the linked list has a first pointer and a second pointer. The first pointer is located in a first spot in the entry and a second pointer is located in a second spot in the entry. Accordingly, an order of the pointers within the entry is maintained by which spot they are placed in within the entry. Additionally, each entry is linked to a next entry in the linked list to establish an order among the entries. While an entry is discussed as including two pointers, in other embodiments, an entry may include more pointers. In this way, entries are optimized according to attributes of a list memory that stores the linked list. Optimizing the entries by including a certain number of pointers in each entry occurs, for example, according to a memory channel burst length of the list memory to permit the memory channel to be fully used, to spread accesses across memory channels, and so on.

At 530, the memory controller 110 stores (i.e., manages) the linked list in a list memory that is an on-chip memory of the memory controller 110. Storing the linked list in the on-chip memory permits accessing the linked list independently of a processor and without using a processor to traverse/trace pointers in the linked list. However, using the memory controller 110 to trace pointers of a linked list stored in an on-chip memory improves read requests since the memory controller 110 has direct access to the on-chip memory and thus also to the linked list. Accordingly, latencies are improved when implementing the linked list in an on-chip memory of the memory controller 110.

At 540, the memory controller 110 accesses (i.e., manages) a portion of data using the linked list independent of interaction from a processor (e.g., CPU). In one embodiment, the memory controller 110 accesses the data in response to a memory access request for the portion of the data referenced by a pointer in the linked list. The memory access request is, for example, a request to read, modify or write the portion of data. To access the data the memory controller 110, for example, traces pointers of the linked list in the on-chip list memory until locating a pointer that addresses a location in memory referenced by the memory access request. Accordingly, storing the linked list in the on-chip memory permits accessing the linked list independently of a processor by traversing, in the memory controller 110, the linked list without using the processor to locate the pointer. In this way, latencies associated with sequentially tracing pointers in a linked list are improved.

While the method 500 is discussed from the perspective of the memory controller 110 and in reference to generic data, in one embodiment, the method 500 is implemented and performed by a device with independent memory controllers for ingress and egress data. Accordingly, the method 500 may be performed in multiple instances by the independent memory controllers to separately implement linked lists for network packets being sent and received on ingress and egress paths in the device.

Figure 6:
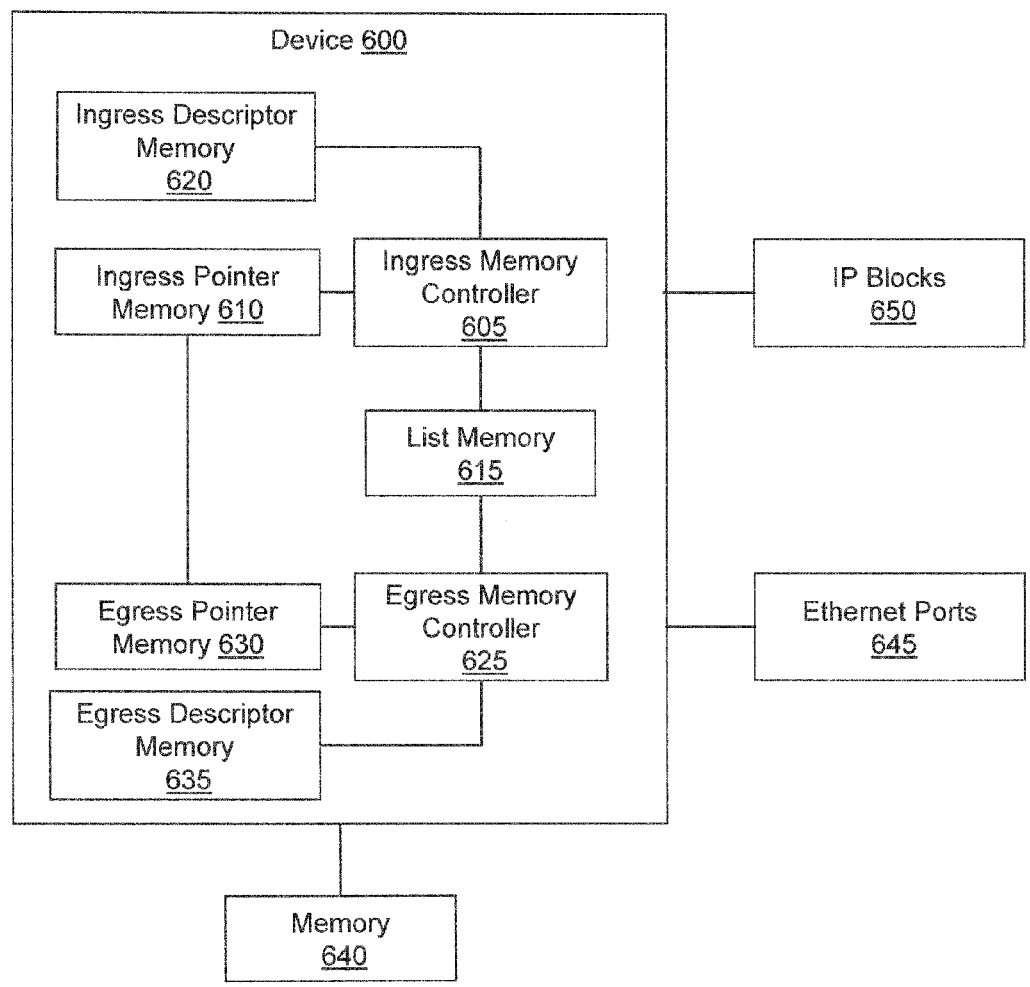
FIG. 6 illustrates one embodiment of a device associated with improving communication latencies by using a hardware linked list.

For example, consider FIG. 6, which illustrates one embodiment of a device 600 associated with improving communication latencies by using a hardware linked list. The device 600 includes an ingress memory controller 605, an ingress pointer memory 610, a list memory 615, an ingress descriptor memory 620, an egress memory controller 625, an egress pointer memory 630, and an egress descriptor memory 635. The device 600 is connected to a memory 640 (e.g., a RAM) which is configured to store data.

In general, the device includes two separate processing paths, an egress path and an ingress path. The ingress path includes the ingress memory controller 605 which is similar to the memory controller 110 of FIG. 1. The ingress path also includes the ingress pointer memory 610 and the ingress descriptor memory 620, which are similar to the pointer memory 120 and the descriptor memory 130 of FIG. 1. The ingress memory controller 605 is configured to assemble and access linked lists for data received on Ethernet ports 645 and provided to IP blocks 650 in a similar manner as discussed with handling data in reference to method 500 of FIG. 5. The Ethernet ports 645 are ports of a networking device (e.g., NIC, gateway, etc.) in which the device 600 is integrated. The IP blocks 650 are processing blocks that process network packets/data according to, for example, protocols (e.g., RDMA) of different layers of the Open Systems Interconnection (OSI) model.

The egress path includes the egress memory controller 625 which is similar to the memory controller 110 of FIG. 1. The egress path also includes the egress pointer memory 630 and the egress descriptor memory 635, which are similar to the pointer memory 120 and the descriptor memory 130 of FIG. 1. The egress memory controller 625 is configured to assemble and access linked lists for data provided from the IP blocks 650 and destined for the Ethernet ports 645 in a similar manner as discussed with handling data in reference to method 500 of FIG. 5.

Furthermore, the ingress memory controller 605 and the egress memory controller 625 share the list memory 615. That is, linked lists assembled by either controller are stored in the list memory 615, which is an on-chip memory of the device 600. Additionally, the ingress pointer memory 620 and the egress pointer memory 630 may be shared between the controllers, separate but linked together, and so on. In either case, the memories 620 and 630 are similar to the pointer memory 120 of FIG. 1 and include a free list of pointers that are unallocated.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment," "an embodiment," "one example," "an example," and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Logic", as used herein, includes a computer or electrical hardware component(s), firmware, a non-transitory computer readable medium that stores instructions, and/or combinations of these components configured to perform a function(s) or an action(s), and/or to cause a function or action from another logic, method, and/or system. Logic may include a microprocessor controlled by an algorithm to perform one or more of the disclosed functions/methods, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic component. Similarly, where a single logic component is described, it may be possible to distribute that single logic component between multiple physical logic components. In some embodiments, one or more of the components and functions described herein are implemented using one or more of the logic components.

While for purposes of simplicity of explanation, illustrated methodologies are shown and described as a series of blocks. The methodologies are not limited by the order of the blocks as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional, not illustrated blocks.

To the extent that the term "includes" or "including" is employed in the detailed description or the claims, it is intended to be inclusive in a manner similar to the term "comprising" as that term is interpreted when employed as a transitional word in a claim.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims.

What is claimed is:

1. An apparatus, comprising:
a pointer memory configured to store a free list that includes a plurality of pointers that each point to an address in a memory that is unallocated;
a memory controller configured to manage a linked list using pointers from the plurality of pointers stored in the free list, wherein pointers of the linked list are assigned from the plurality of pointers and reference data of a single network packet stored in the memory, and wherein the memory controller manages a separate linked list for each network packet of a plurality of network packets,
wherein the memory controller is configured to, in response to a memory access request for a portion of the single network packet, traverse the linked list using the pointers of the linked list to access the portion that is referenced by at least one of the pointers of the linked list and modify the portion according to the memory access request;
a list memory configured to store the linked list; and
a descriptor memory configured to store a descriptor of the linked list in a queue that is an on-chip memory of the apparatus, wherein the descriptor includes a head pointer that references a first entry of the linked list, a tail pointer that references a final entry of the linked list and a pointer count that indicates a number of pointers in the linked list for the network packet, and wherein the descriptor memory includes descriptors for network packets that are ingressing and network packets that are egressing the apparatus.

2. The apparatus of claim 1, wherein the memory controller is configured to manage the linked list by assembling the linked list in response to receiving a plurality of separate portions of the single network packet, wherein the plurality of separate portions are stored in separate memory locations of the memory, and wherein the pointers of the linked list are assigned to the plurality of separate portions from the free list to maintain an order of the plurality of separate portions of the network packet.

3. The apparatus of claim 1, wherein the linked list is a list of successive pointers that point to locations in the memory where successive portions of the single network packet are stored, wherein the list memory is an on-chip memory of the apparatus.

4. The apparatus of claim 1, wherein the memory controller is configured to assemble and traverse the linked list independently of a central processing unit (CPU).

5. The apparatus of claim 1, wherein the memory controller is configured to control storing the plurality of network packets that are ingressing and egressing the apparatus to and from a network.

6. A method, comprising:
  receiving, in a memory controller, data to be stored in a memory;
  managing, in the memory controller, a linked list using pointers retrieved from a free list, wherein the free list is implemented as part of the memory controller and contains a plurality of pointers that each point to locations in the memory that are unallocated,
  wherein managing the linked list includes assembling the linked list from pointers of the free list in response to receiving the data that is to be stored in the memory, wherein the data is a network packet, and wherein pointers of the linked list indicate addresses of where the network packet is to be stored in the memory; and
  storing, in a list memory that is an on-chip memory of the memory controller, the linked list,
  wherein storing the linked list includes storing a descriptor of the linked list in a queue that is implemented in an on-chip memory of the memory controller, wherein the descriptor includes a head pointer that references a first entry of the linked list, a tail pointer that references a final entry of the linked list and a pointer count that indicates a number of pointers in the linked list for the network packet, and wherein storing the descriptor includes storing a descriptor for network packets that ingressing and for network packets that are egressing,
  wherein receiving the network packet includes receiving the network packet in a network interface card that includes the memory controller;
  in response to a memory access request for a portion of the data referenced by a pointer in the linked list, traversing, by the memory controller, the linked list using the pointers to access the portion that is referenced by at least one of the pointers and modify the portion of data according to the memory access request.

7. The method of claim 6, wherein managing the linked list includes managing a separate linked list for each of a plurality of network packets.

8. The method of claim 7, wherein storing the linked list in the on-chip memory permits accessing the data independently of a central processing unit (CPU) by traversing, in the memory controller, the linked list to locate a pointer in the linked list that points to data associated with the memory access request without using the CPU.

9. The method of claim 6, wherein the linked list is a list of pointers that point to locations in the memory where successive portions of the data are stored once allocated, wherein managing the linked list includes assembling the linked list with a series of pointer entries that each reference a next pointer entry in the linked list.

10. The method of claim 6, wherein managing the linked list includes assembling, in the memory controller, the linked list using pointers from the free list by iteratively assigning pointers from the free list to successive portions of the data and linking the pointers by referencing a next pointer in the linked list using a current pointer.

11. The method of claim 6, wherein managing the linked list includes assembling the linked list using the pointers to cause addresses in the memory referenced by the pointers to be allocated to store the data.

12. The method of claim 6, further comprising communicating with a network interface card that is configured to communicate with a cloud computing system.

13. The method of claim 6, wherein storing the linked list includes storing a plurality of linked lists for network packets that are ingressing and egressing the memory controller to and from a network.

14. A device, comprising:
  an ingress memory controller configured to assemble an ingress linked list of pointers for each network packet received from a network, wherein the ingress linked list of pointers includes pointers that are assigned to point to locations in a memory where successive portions of each network packet are to be stored once allocated;
  an egress memory controller configured to assemble an egress linked list of pointers for each network packet egressing the device to the network, wherein the egress linked list of pointers includes pointers that are assigned to point to locations in the memory where successive portions of each network packet are to be stored once allocated;
  a linked list memory connected to the egress memory controller and the ingress memory controller, wherein the egress memory controller and the ingress memory controller are configured to store the ingress linked list and the egress linked list respectively in the linked list memory, wherein the linked list memory is an on-chip memory of the device;
  a pointer memory connected to the ingress controller and the egress controller, wherein the egress memory controller and the ingress memory controller are configured to store a free list of pointers in the pointer memory, wherein the free list of pointers includes pointers to addresses in the memory that are unallocated, wherein the ingress memory controller and egress memory controller are configured to use pointers from the free list when assembling the ingress linked list and the egress linked list; and
  an egress descriptor memory connected to the egress memory controller and configured to store descriptors of linked lists for network packets egressing the device, wherein the device is part of a network interface card,
  wherein the ingress memory controller and the egress memory controller are configured to traverse the ingress linked list or the egress linked list, respectively, in response to a memory access request for a portion of each network packet referenced by the ingress linked list or the egress linked list and to modify the portion according to the memory access request.

15. The device of claim 14, wherein the ingress controller and the egress controller are configured to assemble a separate linked list for each of a plurality of network packets, wherein the ingress memory controller and egress memory controller are configured to traverse the ingress linked list and the egress linked list in the linked list memory independently of a central processing unit (CPU) associated with the device,
  and wherein the portion of each network packet is stored in the memory managed by the device.

* * * * *